March 12, 1940.  H. S. BROWN  2,193,221
REVERSE GEARING
Filed Aug. 3, 1938  3 Sheets-Sheet 1

INVENTOR:
Hugh S. Brown
ATTORNEYS.

March 12, 1940.   H. S. BROWN   2,193,221
REVERSE GEARING
Filed Aug. 3, 1938   3 Sheets-Sheet 2

INVENTOR.
Hugh S. Brown
BY
ATTORNEYS.

March 12, 1940.  H. S. BROWN  2,193,221
REVERSE GEARING
Filed Aug. 3, 1938   3 Sheets-Sheet 3

INVENTOR:
Hugh S. Brown
BY
Brown Jackson Boettcher Dienner
ATTORNEYS.

Patented Mar. 12, 1940

2,193,221

UNITED STATES PATENT OFFICE 2,193,221

REVERSE GEARING

Hugh S. Brown, Harvey, Ill.

Application August 3, 1938, Serial No. 222,832

6 Claims. (Cl. 74—204)

This invention relates to gearing, and has to do with driving and reverse gearing.

It is an object of my invention to provide gearing suitable for marine and other uses, which is of simple and compact construction, comprises few parts and is adapted for installation in restricted spaces. More particularly, I provide two axially spaced transmission cones between which is disposed a double drive cone axially adjustable into and out of driving contact with either of the transmission cones, selectively. One of the transmission cones serves to enclose and shield the drive cone and the other transmission cone, the drive cone being driven by a suitable prime mover, such as an internal combustion engine, associated with the transmission means in a novel manner, and all objectionable projections laterally of the engine, such as would interfere with ready installation of the unit, being avoided. Further objects and advantages will appear from the detail description.

Figure 1:
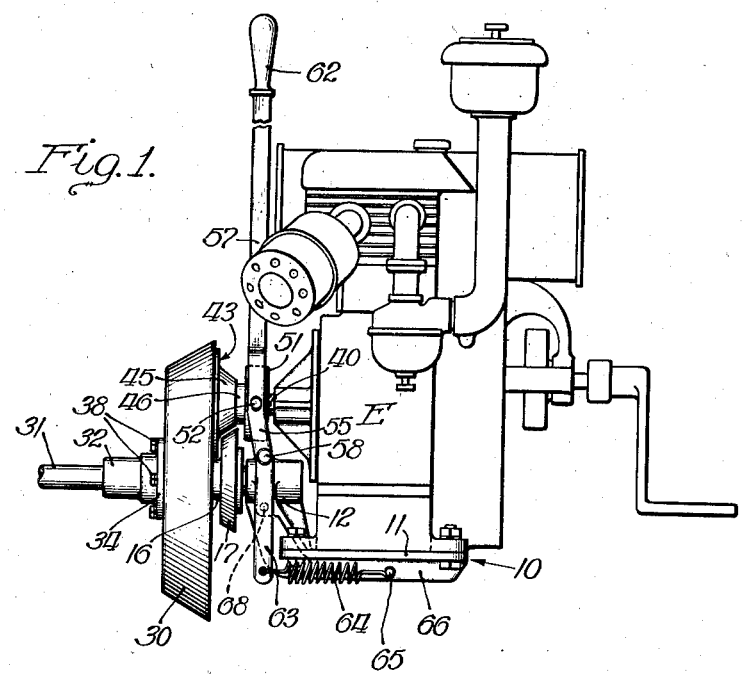
Figure 1 is a side view of a marine reverse gear embodying my invention, associated with an internal combustion engine and comprising therewith a novel power plant and transmission unit.
Figure 2:
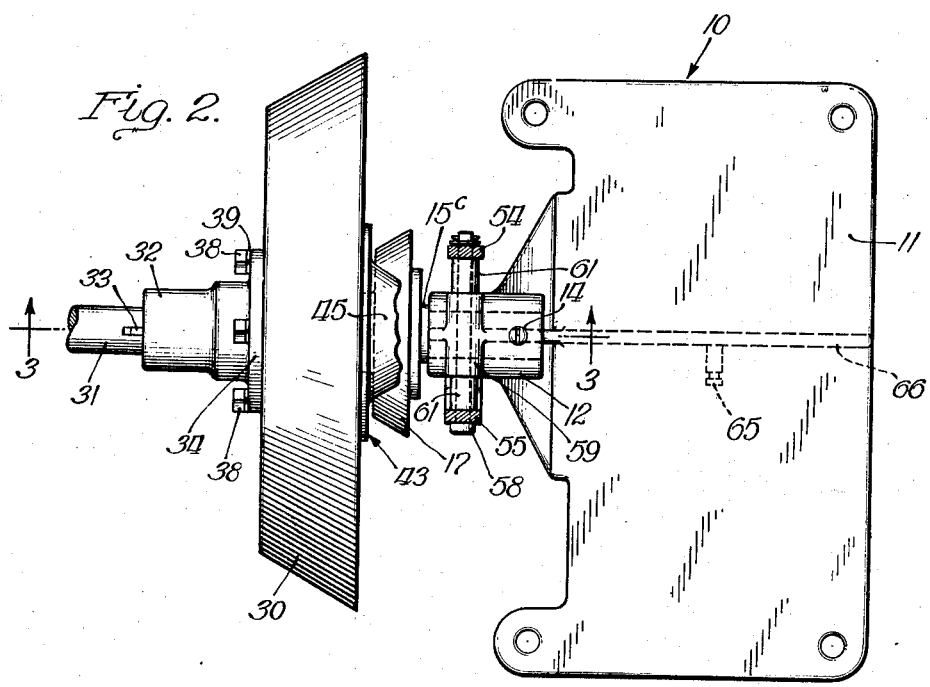
Figure 2 is a plan view, on an enlarged scale and with certain parts broken away for clearness of illustration, of the engine mounting bracket and the marine reverse gear of my invention, certain parts being shown in section.

As illustrated, the marine reverse gear of my invention is associated, by way of example, with a mounting bracket 10 comprising a rectangular plate 11, suitably reinforced, from which an arm 12 extends rearward and upward. This arm is provided, at its upper end, with a sleeve 13 in which is appropriately secured, as by means of a set screw 14, the forward portion 15a of a stub shaft 15 the axis of which extends transversely of plate 11. Stub shaft 15 is provided with a reduced portion 15b extending rearward from a shoulder 15c which contacts the rearward end of sleeve 13, and is further provided, at its rearward end, with a reduced screw stud 15d. A hub member 16 is rotatably mounted upon stub shaft 15 and is provided, at its forward end, with an integral cone 17 recessed, from its forward face, for reception of a ball-bearing structure 18 of known type. Inner race 19 of structure 18 contacts, at its forward end, shoulder 15b, and outer race 20 contacts cone 17, at the outer end of the recess therein, as shown. Hub 16 is further provided, at its outer end, with an enlargement 21 appropriately recessed for reception of a ball-bearing structure 22 of known type. Inner race 23 of ball-bearing structure 22 contacts, at its rearward end, a washer 24 disposed about screw stud 15d and confined between inner race 23 and a nut 25 screwed upon stud 15d.

Enlargement 21 of hub 16 is provided with outwardly projecting lugs 26, and is reduced rearward of lugs 26 to provide a centering collar 27. Collar 27 fits snugly into a corresponding opening 28 extending through a drum 29 centrally thereof. This drum is provided with a forwardly and outwardly inclined flange providing a second transmission cone 30 concentric with and of greater radial extent than the cone 17. The hub 16 serves to space cone 17 and the cone member comprising the drum 29 and flange 30 apart axially.

A propeller shaft 31 is disposed in endwise relation to stud shaft 15, conveniently coaxially therewith. The forward end of propeller shaft 31 is secured in a coupling member 32 in any appropriate manner, conveniently by means of a key 33. The forward portion of coupling member 32 is enlarged and recessed to accommodate screw stud 15d and the parts mounted thereon, and is also provided with an outwardly projecting circumferential flange 34. Coupling member 32 is further provided with a centering collar 35 which extends into collar 27 of enlargement 21 and contacts the rearward end of outer race 36 of the ball-bearing structure 22, the forward end of race 36 contacting enlargement 21 at the forward end of the recess therein. The ball-bearing structures 18 and 22 confine the hub 16 against endwise movement relative to stub shaft 15 and take end thrust to which the hub member may be subjected in either direction, as well as radial thrust, as will be readily understood.

Cap screws 38 pass through flange 34 of coupling member 32 and drum or web element 29 of the rearward transmission cone and thread into lugs 26 of enlargement 21 of hub 16, split spring washers 39 of known type being disposed between flange 34 and the heads of screws 38. In this manner the rearward transmission cone is secured to the rearward end of hub 16 and to the coupling member 32, thus establishing driving connection between propeller shaft 31 and the transmission cones. The transmission cones and hub 16 may be formed of any suitable material, such as, for example, cast iron.

Figure 3:
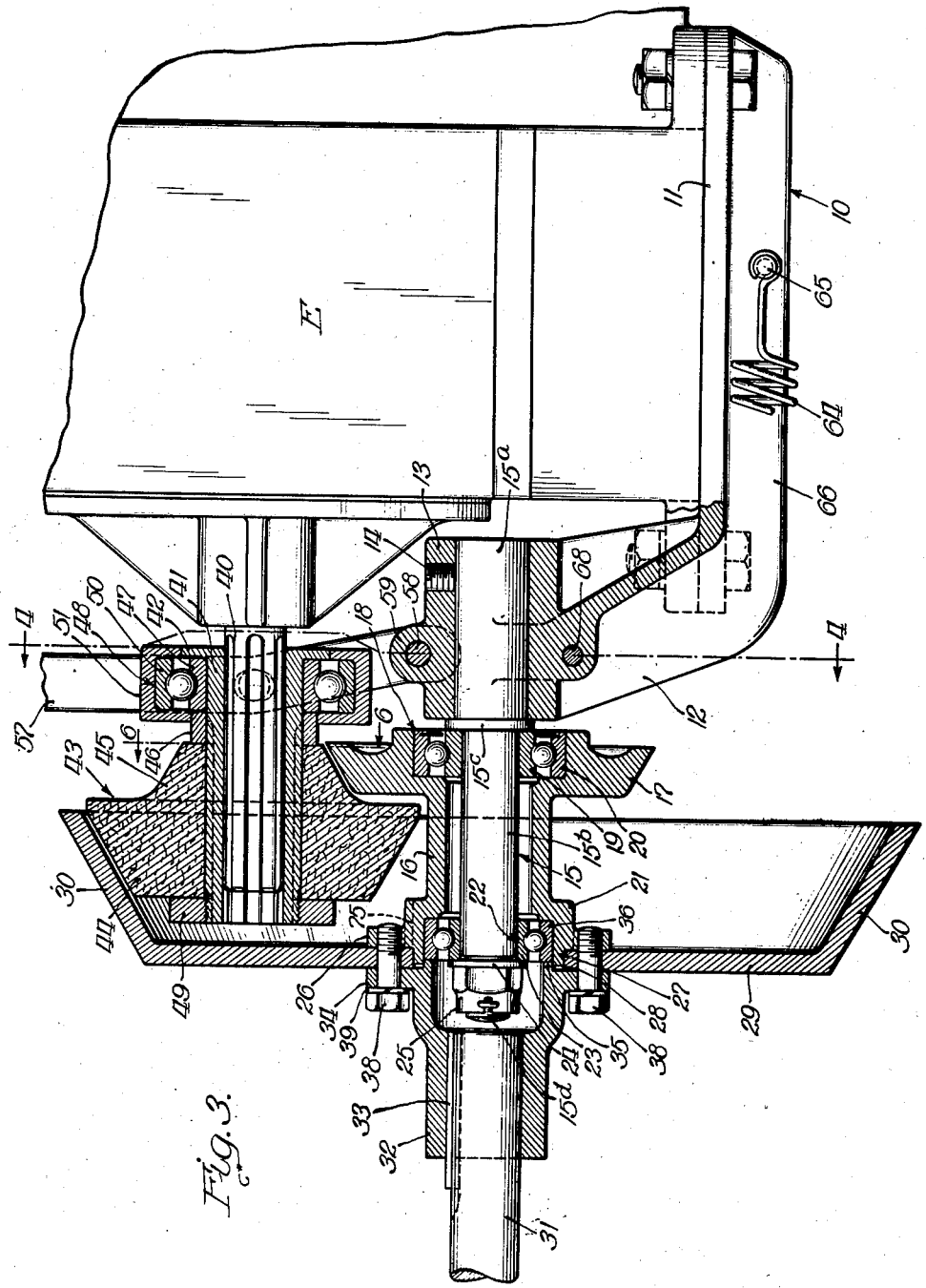
Figure 3 is a sectional view, on an enlarged scale, taken substantially on line 3—3 of Figure 2, certain parts being shown in elevation and certain other parts being broken away, the engine being shown fragmentarily and in side view.

Plate 11 of bracket 10 receives an internal combustion engine E of known type, appropriately secured upon the plate, as by bolting. Engine E is provided with a rearwardly projecting crank shaft 40 which extends between the transmission cones 17 and 30. Shaft 40 may be either parallel or non-parallel with shaft 31 and stub shaft 15, in practice, but is shown, for purposes of illustration, as parallel therewith. A sleeve 41, provided at its forward end with an outwardly projecting circumferential flange 42, is splined upon shaft 40 for rotation therewith and for sliding movement lengthwise thereof. A double drive cone 43, comprising a rearward cone element 44 and a forward cone element 45, is splined upon sleeve 41 and disposed between cones 17 and 30. Element 43 is provided with a friction face disposed for contact with the inner friction face of cone 30, and element 45 is provided with a friction face disposed for contact with the friction face of cone 17. In Figure 3 the double drive cone 43 is shown in its neutral position. It may be formed of any suitable friction material, such as vulcanized fiber.

Drive cone 43 abuts, at the forward face of element 45 thereof, a collar 46 fitting about sleeve 41. Collar 46 contacts, at its forward edge, inner race 47 of a ball-bearing structure 48 of known type, the forward edge of inner race 47 being in contact with the rearward face of flange 42. The rearward face of drive cone 43 is in contact with a nut 49 threaded upon the rearward end of sleeve 41, which projects a short distance rearward beyond cone 43. In this manner, the drive cone is confined against relative movement lengthwise of sleeve 41. Outer race 50 of the ball-bearing structure 48 fits within a channel ring 51 the flanges of which fit snugly about collar 46 and flange 42 of the sleeve 41.

Ring 51 is provided with two diametrically disposed outwardly projecting studs 52, which project through slots 53 in arms 54 and 55 of fork 56 of a control lever 57. A pivot pin 58 passes through arms 54 and 55, and through a boss 59 integral with sleeve 13 at the top thereof and perpendicular to the axis of sleeve 13, suitable spacers 61 being interposed between arms 54 and 55 and boss 59. Lever 57 extends upward an appropriate distance from pin 58 and is provided, at its upper end, with a suitable handle 62. This lever and associated parts provide means whereby the drive cone 43 may be adjusted into driving contact with either of the transmission cones, selectively, the end thrust incident to such adjustment of the drive cone being taken by the ball-bearings 48, as will be understood. It is intended that a propeller (not shown) be appropriately mounted upon the propeller shaft 31, and that this shaft be driven in a direction for propelling the boat forward when the drive cone 43 is in driving contact with transmission cone 30. When drive cone 43 is in driving contact with transmission cone 17 the direction of rotation of shaft 31 will be reversed, as will be obvious. The ratios between elements 44 and 45 of the drive cone and the transmission cones 30 and 17, respectively, may be of any desired value, within limits. It will be noted that the drive cone 43 and the transmission cone 17, as well as the drive surface of the cone 30, are enclosed and shielded by the latter cone, which is desirable when the unit is used for propelling small open boats. Further, by having the drive cone 43 axially adjustable for selectively driving either of the transmission cones, the control lever 57 may be disposed to project upward thus avoiding objectionable projections laterally of the unit, such as would interfere with its installation in restricted spaces.

Figure 4:
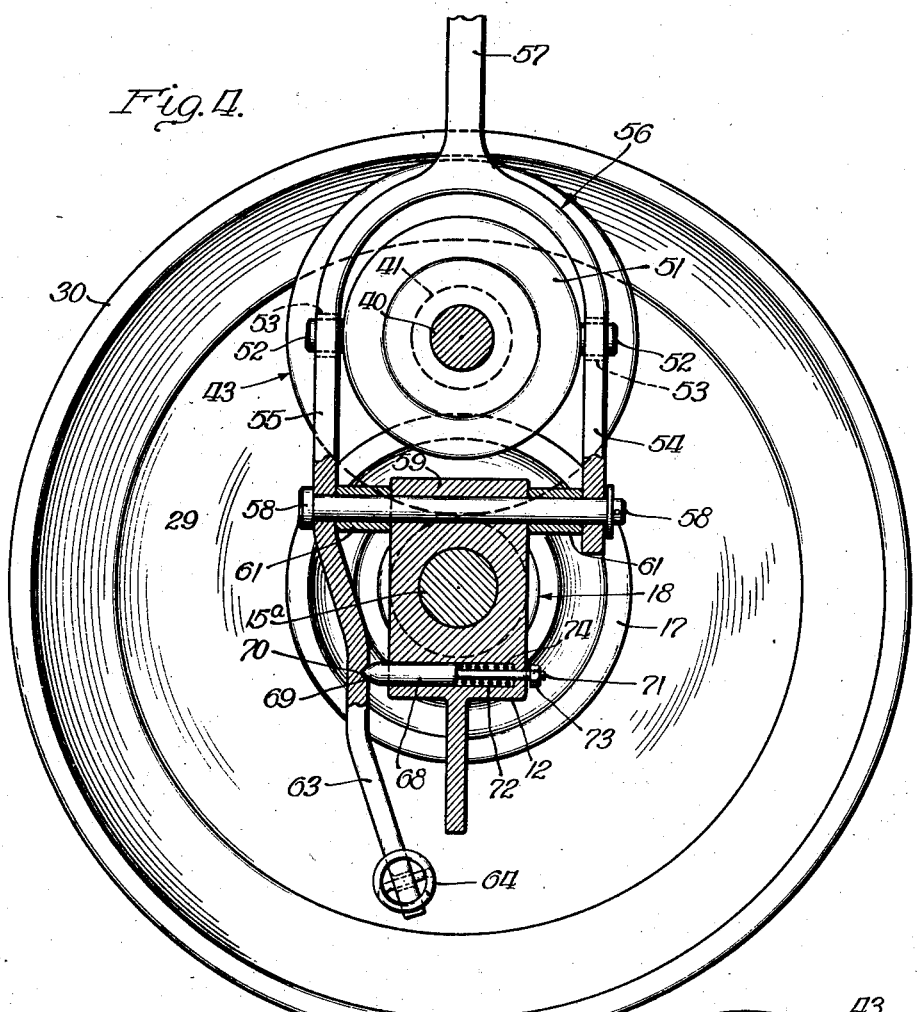
Figure 4 is a sectional view taken substantially on line 4—4 of Figure 3, certain parts being shown in elevation and certain other parts being partly broken away and shown in section.
Figure 5:
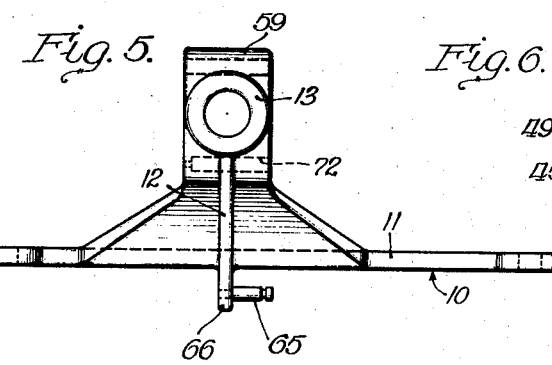
Figure 5 is a rearward end view of the engine mounting bracket, on the same scale as Figure 2.
Figure 6:
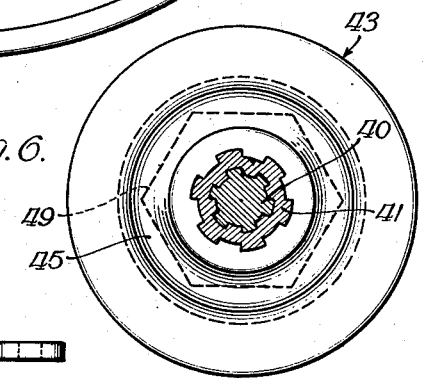
Figure 6 is a sectional view taken substantially on line 6—6 of Figure 3, omitting the inner transmission cone.

The control lever 57 is operated manually and, if desired, may be held in its different positions by hand. Preferably, however, I provide means whereby necessity of holding the lever in forward and neutral positions, by hand, is avoided. Referring to Figures 1 and 4, arm 55 of yoke 56 is provided with an integral downward extension 63 which is inclined downward toward arm 12 of bracket 10, as in Figure 4. A tension coil spring 64 has its rearward end anchored to the lower end of extension 63, and its forward end anchored to a pin 65 secured in reinforcing rib 66 extending transversely of plate 11 therebeneath and forming a continuation of an element of arm 12. Tension spring 64 urges lever 57 in counterclockwise direction, as viewed in Figure 1, about pivot pin 58, and is effective for holding element 44 of drive cone 43 in driving contact with transmission cone 30. In this manner the control lever 57 may be maintained in forward drive position. When it is desired to reverse the drive, lever 57 is swung forward, or in clockwise direction as viewed in Figure 1, by hand, so as to move the element 45 of drive cone 43 into driving contact with transmission cone 17, in which position lever 57 is held by hand. Since the time during which the control lever is held in reverse drive position is quite short, relative to the time during which the lever is held in its forward drive position, there is no real objection to holding the control lever by hand in reverse drive position, but any suitable means may be provided for retaining it in the latter position, if desired.

It is desirable that means be provided for retaining the control lever 57 in neutral position. To that end I provide a spring pressed detent 68, operating in a suitable bore in arm 12, below sleeve 13 and disposed transversely thereof, this detent being provided, at its outer end, with a rounded nose 69 for engagement in a corresponding recess 70 in extension 63 of arm 55. Conveniently, detent 68 is provided with a reduced shank 71 projecting from the other end thereof and slidable through arm 12, at the inner end of bore 72 which receives detent 68, a stop in the form of a nut 73 being threaded upon the outer end portion of shank 71. Nut 73 contacts the outer face of arm 12 and limits outward movement of detent 68, under the influence of compression coil spring 74 disposed in bore 72 and confined between the wall at the inner end of this bore and the inner end of detent 68. When lever 57 is moved into neutral position, nose 69 of detent 68 engages in recess 70 and maintains the control lever in neutral position, thus holding the drive cone 43 in its neutral position shown in Figure 3.

Enlargement 21 of hub 16 is provided, between certain of the lugs 26, with a recess 75 of appropriate size and depth to accommodate the lower portion (Figure 3) of drive cone 43. By uncoupling shaft 31 and dropping it below cone 29—30, removing the latter from enlargement 21 of hub 16, and removing nut 49 from sleeve 41, cone 43 may be slid rearward off of sleeve 41. In that manner, the drive cone 43 may be removed and replaced with expedition and facility, when and if desired or necessary.

The engine and the gearing together constitute a unit particularly suitable for use in marine work. It will be understood that when this unit is installed in a boat, the propeller shaft 31 extends through a suitably disposed stuffing box, in a known manner. The propeller shaft is shown as disposed coaxially with the transmission cones, although it may be otherwise disposed if required, within the broader aspects of my invention, and suitable provision made for establishing driving connection between the propeller shaft and the transmission.

While the gearing as described is well suited for use with an internal combustion engine, in marine work, it may also be used for many other purposes. Within the broader aspects of my invention, shaft 40 is a drive shaft and may be driven in any suitable manner, and associated with any suitable prime mover other than an internal combustion engine, and stub shaft 15 and shaft 31 together constitute a driven shaft which may drive a propeller or any suitable mechanism. The drive shaft and the driven shaft may be arranged in parallelism one with the other, as shown by way of example, or may be arranged in non-parallel relation, as desired or necessary, the friction surfaces of the drive cone and the transmission cones, in either case, being appropriately formed for cooperation in the manner above described.

It will be understood, as above indicated, that changes in construction and arrangement of parts of my invention may be resorted to without departing from the field and scope of the same, and I intend to include all such variations, as fall within the scope of the appended claims, in this application in which the preferred form only of my invention has been disclosed.

I claim:

1. In combination, a driven shaft confined against axial movement, two similarly directed transmission cones of different radial extent fixed to said shaft and spaced apart axially, a drive shaft confined against axial and radial movement, and a double drive cone on and driven by said drive shaft disposed between said transmission cones and axially adjustable into and out of driving contact with either thereof, selectively.

2. In combination, a driven shaft confined against axial movement, two similarly directed transmission cones of different radial extent fixed to said shaft and spaced apart axially, a drive shaft extending between said cones and confined against axial and radial movement, and a double drive cone on said shaft driven thereby and slidable lengthwise thereof into and out of driving contact with either of said transmission cones, selectively.

3. In combination, a stub shaft and a coaxial propeller shaft both confined against axial and radial movement, a transmission member comprising a hub rotatably mounted on said stub shaft confined against relative endwise and radial movement and provided at one end with a transmission cone rigid therewith, a second transmission cone at the other end of said hub and axially spaced thereby from said first cone, said second cone being of greater radial extent than said first cone, means securing said hub and said second cone together and to said propeller shaft, a drive shaft parallel with said stub shaft, and a double drive cone on and driven by said drive shaft disposed between said transmission cones and axially adjustable into and out of driving contact with either thereof, selectively.

4. In combination, a driven shaft confined against axial and radial movement, two similarly directed rigidly connected transmission cones of different radial extent spaced apart axially and having driving connection to said shaft, a drive shaft extending between said cones and confined against axial and radial movement, a double drive cone on and driven by said drive shaft disposed between said transmission cones, and means for causing relative axial movement between said transmission cones and said drive cone effective for establishing driving contact between the latter and either of said transmission cones, selectively.

5. In a drive and reverse unit, transmission means comprising two similarly directed axially spaced transmission cones secured together and both confined against axial and radial movement, one of greater radial extent than the other, a drive shaft extending between said cones and confined against axial and radial movement, and a double drive cone mounted on and driven by said shaft between said transmission cones and axially adjustable into and out of driving contact with either thereof, selectively.

6. In combination, a first shaft mounted for rotation and confined against axial and radial movement, two similarly directed rigidly connected axially spaced cones of different radial extent mounted on said shaft with driving connection thereto, a second shaft mounted for rotation parallel with said first shaft extending between said cones and confined against axial and radial movement, a double cone on said second shaft with driving connection thereto and disposed between said two cones, the latter and said double cone having relative axial movement, and means for causing relative axial movement between said two cones and said double cone effective for establishing driving contact therebetween and driving one of said shafts from the other thereof and optionally reversing the direction of drive of said one shaft relative to said other shaft.

HUGH S. BROWN.